United States Patent [19]

Smith

[11] 3,800,077

[45] Mar. 26, 1974

[54] AUTOMATIC SHARPNESS-ENHANCING EQUIPMENT FOR TELEVISION PICTURE SIGNALS

[75] Inventor: Clyde W. Smith, North Salem, N.Y.

[73] Assignee: Columbia Broadcasting System, Inc., New York, N.Y.

[22] Filed: Oct. 15, 1971

[21] Appl. No.: 189,573

[52] U.S. Cl. ............ 178/6.8, 178/7.1, 178/DIG. 25, 178/DIG. 34

[51] Int. Cl. ............ H04n 5/14

[58] Field of Search ....... 178/DIG. 25, DIG. 34, 7.1, 178/7.2, 6.8, DIG. 3

[56] References Cited

UNITED STATES PATENTS

| | | | |
|---|---|---|---|
| 3,115,545 | 12/1963 | Gebel | 178/6.8 |
| 2,678,389 | 5/1954 | Loughlin | 178/DIG. 34 |

FOREIGN PATENTS OR APPLICATIONS

| | | | |
|---|---|---|---|
| 233,738 | 5/1969 | U.S.S.R. | 178/DIG. 25 |

*Primary Examiner*—Howard W. Britton
*Assistant Examiner*—Michael A. Masinick
*Attorney, Agent, or Firm*—Martin M. Novack; Spencer Olson

[57] ABSTRACT

An apparatus for automatically generating normalized detail signals from a video signal. Detail signals representative of instantaneous variations in the luminance portion of the video signal are generated. A signal averaging means responsive to the magnitude of the detail signals is provided for generating a control level representative of the detail content of a relatively long duration of the video signal. A modulator responsive to the control level and to the detail signals produces the normalized detail signals.

12 Claims, 2 Drawing Figures

AUTOMATIC SHARPNESS-ENHANCING EQUIPMENT FOR TELEVISION PICTURE SIGNALS

BACKGROUND OF THE INVENTION

This invention relates to apparatus for enhancing the sharpness of a television picture signal and, more particularly, to apparatus for achieving automatic image enhancement by generating normalized detail signals.

In television transmission and reproduction of images a distortion known as aperture distortion arises from the use of a scanning spot of finite size. As a consequence of the response of a television camera to the average light intensity within an image area covered by a spot in any instant, the sharpness of image borderlines of high contrast is reduced. There have been previously devised useful aperture-correction circuits which compensate a derived television information signal for this "spread" of information. In "horizontal aperture correction," each element of picture information on a scanline is compared to the adjacent picture elements occurring before and after the element being acted upon. Since the video signal appears sequentially in time, it is necessary to store video information for periods equal to the duration of one and two picture elements, i.e., about 150 and 300 nanoseconds. Accordingly, using delay lines there are formed signals known as "left," "main" and "right" signals. By combining these three signals in judicious manner, there are produced "horizontal detail signals" that are ultimately added to a delayed version of the video signal to produce a resultant video signal of enhanced resolution. Similarly, there exist "vertical aperture correction circuits" which generate vertical detail signals by an analogous technique wherein a single scanline of video is compared element-by-element with the scanlines preceding and following it. In this case, it is necessary to store video information for periods equal to the duration of one and two horizontal scanlines; i.e., 63.55 microseconds and 127.10 microseconds for EIA television systems. "Top," "main" and "bottom" signals arising from a comparison of successive scanlines are thereby formed, and these are judiciously combined to produce "vertical detail signals" that are also ultimately added to delayed original video. The horizontal and vertical detail signals are generically referred to as "detail signals."

The amount of vertical and horizontal aperture compensation added to a particular television signal can be varied by controlling the overall magnitude of the detail signals added into the original video signal. This is generally accomplished by utilizing a "coefficient of equalization" potentiometer which effectively controls the magnitude of the detail sigals at a desired "equalization level." The equalization level thus, in effect, controls the "sharpness content" of the scenes represented by the video signal. It will be appreciated that certain video scenes inherently have more basic "sharpness content" than other scenes. The amount of sharpness in a picture can be qualitatively sensed by a viewer, being a function of such things as the lighting conditions associated with the scene as well as the particular viewable objects contained within the scene. Quantitatively, the sharpness content of a scene is measurable by the high frequency content of the luminance portion of the video signal representative of the scene in question. For the benefit of the ultimate viewer, it is desirable to transmit television video signals which have a basic sharpness content that does not unnecessarily vary from time to time by virtue of such factors as changes in studio lighting conditions. It, therefore, becomes necessary at the broadcast station to manually readjust the coefficient of equalization potentiometer associated with the aperture correction circuitry in order to maintain continuously acceptable levels of picture sharpness as scenes are changed. The problem is particularly pronounced when a segment of picture information which has been previously enhanced (e.g. prerecorded material) again passes through the correction circuitry. In such case, if further enhancement is not manually prevented, an undesirable condition known as "overenhancement" will ensue.

Accordingly, it is an object of the present invention to provide an apparatus for automatically generating normalized detail signals which can be used without continual readjustment for aperture compensation and sharpness enhancement.

SUMMARY OF THE INVENTION

The present invention is directed to an apparatus for automatically generating normalized detail signals from a video signal which can be subsequently combined with the video signal to produce a video signal of enhanced sharpness content. Means are provided for generating detail signals representative of instantaneous variations in the luminance portion of the video signal. A signal averaging means responsive to the magnitude of the detail signals is provided to generate a control level representative of the amount of detail contained in a relatively long duration of the video signal. Further provided are means responsive to the control level for modulating the detail signals to produce the desired normalized detail signals.

In a preferred embodiment of the invention, the modulating means comprises a multiplier operative to apply gain to the detail signals in accordance with the control level, the amount of gain applied decreasing as the control level increases.

Further features and advantages of the inventions will become more readily apparent from the following detailed description when taken in conjunction with the accompanying drawing.

DESCRIPTION OF THE PREFERRED EMBODIMENT

Figure 1:
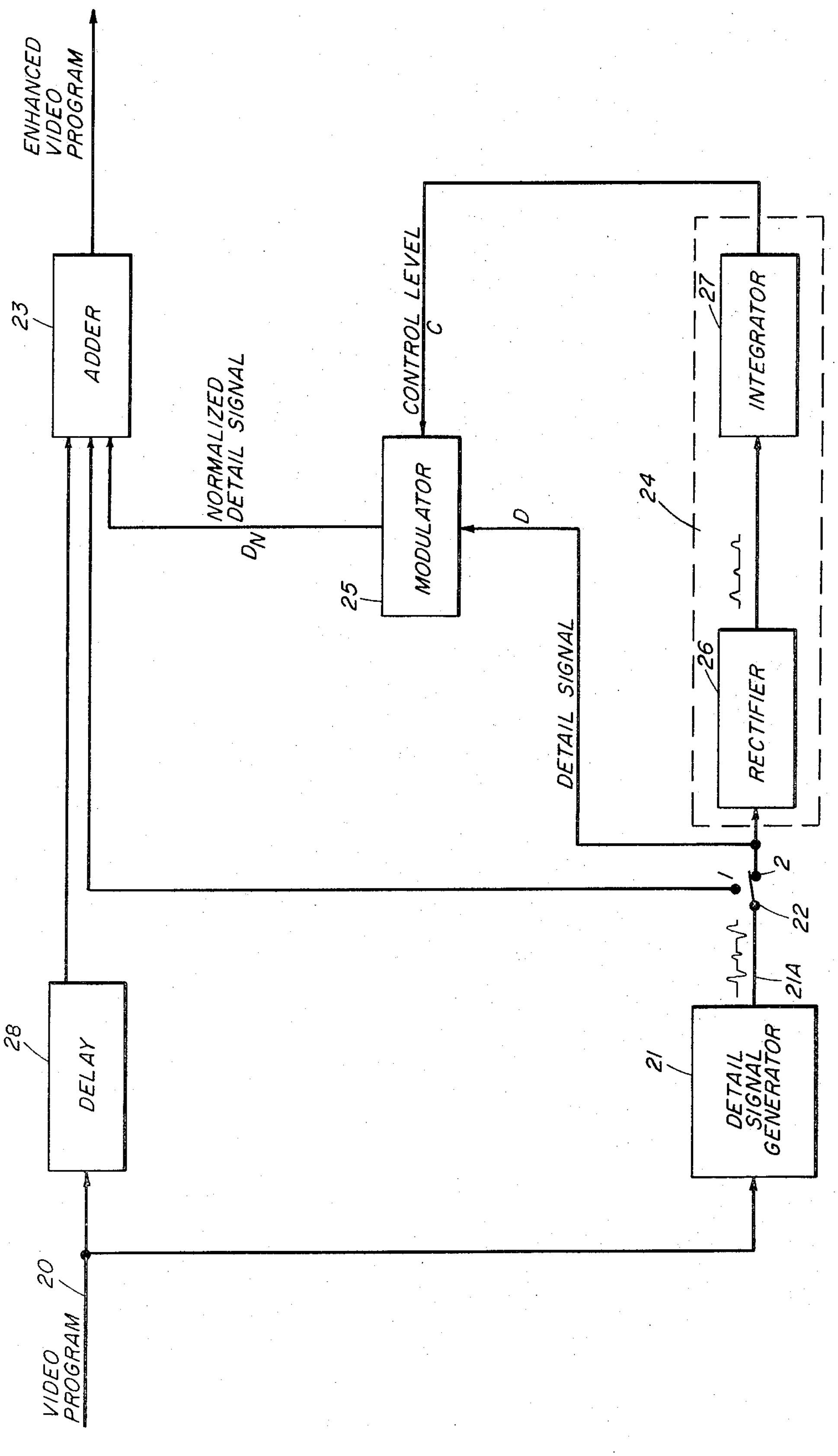
FIG. 1 is a block diagram of the preferred embodiment of the invention.

Referring to FIG. 1, there is shown an embodiment of the invention wherein input program video signals conducted in a channel 20 are supplied to a detail signal generator 21 and delay means 28. A suitable detail signal generator is described in an article entitled "IMPROVED SIGNAL PROCESSING TECHNIQUES FOR COLOR TELEVISION BROADCASTING" by R. H. McMann, Jr. and A. A. Goldberg which appeared in the March, 1968 issue of the journal of the SMPTE. The detail signal generator 21 may be as embodied in a commercial image enhancer such as the CLD Model 500 image enhancer, manufactured by CBS Laboratories, a division of Columbia Broadcasting System, Inc. The CLD image enhancer includes, inter alia, horizontal and vertical aperture correction circuits, the outputs of which are combined to produce detail signals that are shown in FIG. 1 as appearing at the output line 21A of the generator 21. The output line 21A is coupled to the common terminal of a switch 22 which, for the time being, can be considered as being in position "1" such that the output detail signals are coupled to one of the inputs of an adder 23. In this case, the detail signals are added to input program video which has been delayed by delay means 28, and the output of the adder 23 is thus a conventionally enhanced video signal.

Figure 2:
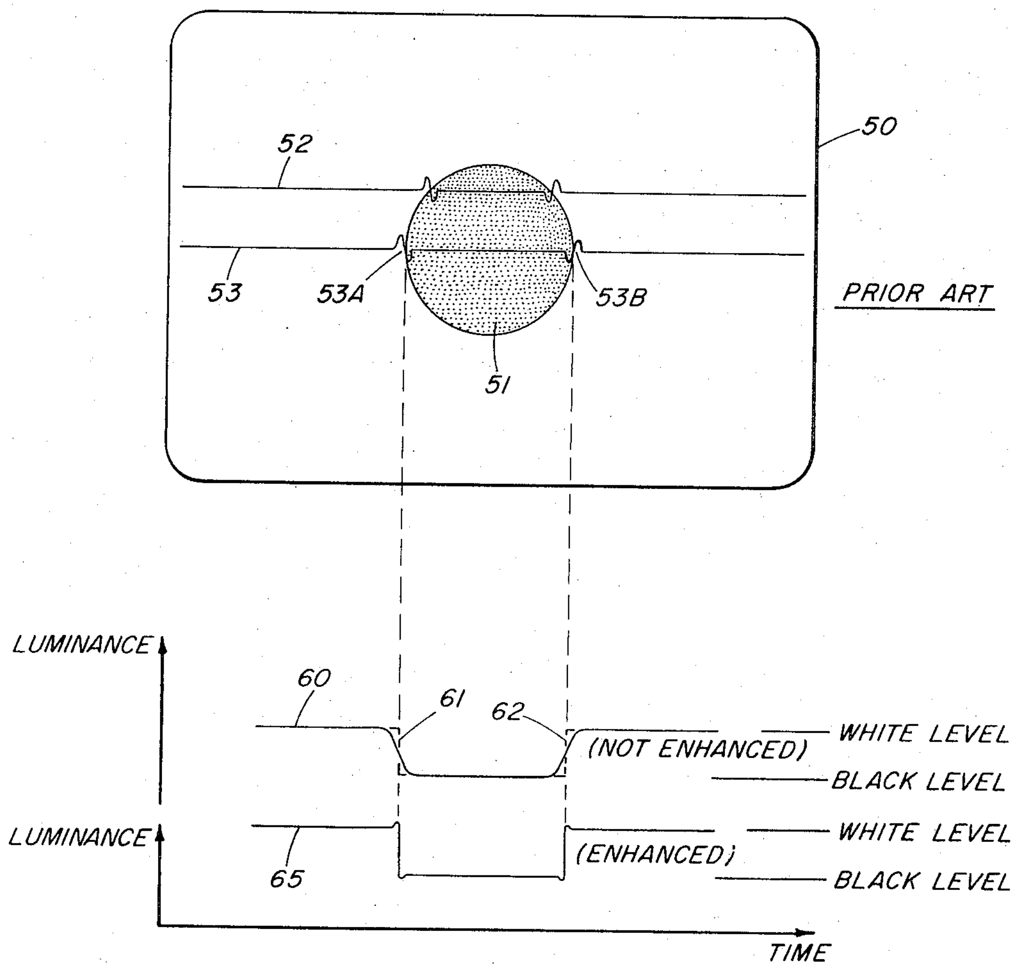
FIG. 2 is an illustration of the principle of conventional video enhancement with detail signals.

To better understand the enhanced sharpness achievable with the detail signal generator 21, reference is made to the simplified illustration of FIG. 2 wherein there is shown a television scene 50 consisting of a large black circular dot 51 on a white background. Superimposed on the screen are individual line traces 52 and 53 which represent the detail signals corresponding to two selected scanlines of a video display signal which form part of the dot and background. It is seen that for this particular display pattern, the detail signal generally has zero amplitude except at positions on the screen corresponding to transitions from white to black or black to white. For example, examining the trace 53 from left to right, it is seen that a first detail signal 53A is formed at the white to black transition, and that this detail signal consists of a short duration positive-going pulse followed immediately by a negative-going pulse of equal duration. At the rightmost extreme of the dot 51, another detail signal 53B is seen to consist of a negative-going short duration pulse followed by a positive-going pulse of the same duration. The luminance signal associated with the trace 53 is illustrated by the curve 60, which is a plot of luminance level versus time for that particular scanline. The luminance starts out at white level during the leftmost white background portion of the sweep, descends to black level to scan the dot 51, and then returns to white level again for completion of the rightmost white background portion. Ideally, the transitions from white-to-black and black-to-white should be as indicated by the sharply contoured dotted segments 61 and 62. In reality, though, aperture distortion causes the television camera signal to take on a rounded form at the transitions as shown in the graph. When the detail signals 53A and 53B are added to the luminance signal 60, the result is the enhanced luminance signal 65 which is more representative of the sharp contrasts of the original scene.

As illustrated in FIG. 2, the detail signals generally consist of pairs of positive and negative-going pulses that coincide with transitions of the luminance portion of the video signal. The relative magnitude of a particular detail signal depends upon the sharpness of the particular transition and upon an overall gain coefficient setting which can be manually established by adjusting a potentiometer in the detail signal generator 21. Thus, operation with the switch 22 in position 1 amounts to conventional use of image-enhancing detail signals and is referred to as a "manual" mode of operation.

When the switch 22 is thrown to the position "2," the equipment is in an "automatic" mode which is the subject of the invention. The detail signals on line 21A are supplied to both a signal averaging means 24 (contained in the dashed enclosure) and a modulator 25. Means 24 includes, in a series arrangement, a rectifier 26 and an integrator 27. The rectifier 26, which is preferably a suitable full-wave rectifier, produces an output (sketched in FIG. 1) that is a convenient measure of the magnitude of the detail signals. The rectifier output is coupled to the integrator 27 which typically comprises a storage capacitor that stores a voltage indicative of a sum of the rectified detail signals. The capacitor is arranged to charge and discharge at a relatively slow rate. For example, in a particular functional embodiment of the invention, a 100 microfarad capacitor is arranged to be charged through an effective resistance of about 1K ohms and to discharge through an effective resistance of about 50K ohms. These values yield charging and discharging time constants of 0.1 seconds and 5 seconds, respectively, which correspond to durations of 6 and 300 television field scans, respectively. The output of integrator 27 is thus a varying D.C. voltage control level which varies at a relatively slow rate as compared to the line rate of the video signal.

The control level output of integrator 27 is fed to the modulator 25 where it controls the level of the detail signals from the generator 21 to produce the desired normalized detail signals. In the preferred embodiment, the modulator 25 comprises an analog multiplier of the type described in an article entitled "New Building Blocks for the Circuit Designer" by M. Elphick, which appeared in the May, 1969 issue of EEE. The inputs to the multiplier are selected such that the normalized detail signal output $D_N$ produced thereby is of the form $$D_N=(2-C)D$$

where D represents the input detail signals and C is the control level. The multiplier is adaptable to limit the effective control input C to any desired value which, in the present case, is chosen as the value 2. Thus the "gain" term, (2—C) is seen to vary between 0 and 2 depending on the value of C.

When the input program video contains relatively little inherent sharpness, the detail signals produced by the generator 21 will have a relatively small overall magnitude and, consequently, the control level C will have a value near zero. In such case, the gain term (2—C) is about 2, so that a maximum gain (established at 2 for this embodiment) is imparted to the detail signals to produce normalized detail signals $D_N$ which will result in enhanced sharpness. On the other hand, when the input program video is inherently sharp, a large control level value of 2 or more will result, which establishes the gain term at zero. (Note that for $C>2$, the limiting of the multiplier prevents a negative gain). Thus, picture information which needs no sharpening will have no generated detail signals added to it. For input program video of intermediate inherent sharpness, proportionate amounts of gain are introduced. It will be appreciated that the maximum allowable gain, selected as 2 in the illustrative embodiment, is a matter of convenient choice.

As indicated above, the time constants associated with the integrator 27 assure that the control level is representative of the amount of detail contained in a relatively long duration of the video signal. This duration should be at least one display field and is preferably longer. The charge time constant of about 0.1 seconds results in a possible fast increase (from a viewer's standpoint) in C and an accompanying decrease in detail gain when the input video information suddenly increases in inherent sharpness. The discharge time constant is substantially longer, about 5 seconds, so that sudden decreases in program sharpness will not result in an immediate increase in detail gain. Rather, the gain will rise in a smooth manner which is unobtrusive to the viewer. The "open loop" configuration of the described preferred embodiment achieves a flexible stability of enhancement without undue complexity.

I claim:

1. Apparatus for automatically generating normalized detail signals from a video signal comprising:

means for generating detail signals representative of instantaneous variations in the luminance portion of said video signal;

signal averaging means responsive to the magnitude of said detail signals for generating a control level representative of the amount of detail contained in a relatively long duration of said video signal; and modulating means responsive to said control level for applying gain to said detail signals to produce said normalized detail signals, the amount of gain applied decreasing as said control level increases.

2. Apparatus as defined by claim 1 wherein said modulating means comprises a multiplier.

3. Apparatus as defined by claim 2 wherein said signal averaging means comprises a rectifier and an integrator in series arrangement.

4. Apparatus as defined by claim 3 wherein said integrator comprises a storage capacitor which stores a voltage indicative of a sum of rectified detail signals.

5. Apparatus as defined by claim 4 wherein the charge and discharge time constants associated with said capacitor are relatively long as compared with the line rate of said video signal.

6. Apparatus as defined by claim 5 wherein said charge time constant is substantially shorter than said discharge time constant.

7. Apparatus for receiving an input video signal and automatically generating an enhanced video signal comprising:

means for generating detail signals representative of instantaneous variations in the luminance portion of said input video signal;

signal averaging means responsive to the magnitude of said detail signals for generating a control level representative of the amount of detail contained in a relatively long duration of said input video signal;

modulating means responsive to said control level for applying gain to said detail signals to produce said normalized detail signals, the amount of gain applied decreasing as said control level increases;

means for delaying said input video signal; and means for adding said normalized detail signals to the delayed input signals to produce said enhanced video signal.

8. Apparatus as defined by claim 7 wherein said modulating means comprises a multiplier.

9. Apparatus as defined by claim 8 wherein said signal averaging means comprises a rectifier and an integrator in series arrangement.

10. Apparatus as defined by claim 9 wherein said integrator comprises a storage capacitor which stores a voltage indicative of a sum of rectified detail signals.

11. Apparatus as defined by claim 10 wherein the charge and discharge time constants associated with said capacitor are relatively long compared with the line rate of said input video signal.

12. Apparatus as defined by claim 11 wherein said charge time constant is substantially shorter than said discharge time constant.

* * * * *